United States Patent
Lausenhammer et al.

(10) Patent No.: US 7,517,213 B2
(45) Date of Patent: Apr. 14, 2009

(54) COOLING SYSTEM FOR THE COOLING OF TOOL PIECES

(75) Inventors: Manfred Lausenhammer, Konz-Niedermennig (DE); Christian Wagner, Mainz (DE)

(73) Assignee: MHT Mold & Hotrunner Technology AG, Hochheim/Main (DE)

( * ) Notice: Subject to any disclaimer, the term of this patent is extended or adjusted under 35 U.S.C. 154(b) by 226 days.

(21) Appl. No.: 10/545,188

(22) PCT Filed: Feb. 10, 2004

(86) PCT No.: PCT/DE2004/000235

§ 371 (c)(1),
(2), (4) Date: Jul. 19, 2006

(87) PCT Pub. No.: WO2004/071743

PCT Pub. Date: Aug. 26, 2004

(65) Prior Publication Data

US 2006/0263466 A1   Nov. 23, 2006

(30) Foreign Application Priority Data

Feb. 12, 2003 (DE) .............................. 103 05 669

(51) Int. Cl.
B29C 45/73 (2006.01)
(52) U.S. Cl. ................ 425/547; 425/548; 425/552
(58) Field of Classification Search .............. 425/547, 425/548, 552
See application file for complete search history.

(56) References Cited

U.S. PATENT DOCUMENTS 2,542,263 A    2/1951  Schultz .......................... 18/55
4,703,912 A   11/1987  Aoki ............................ 249/81
5,055,025 A * 10/1991  Muller ........................ 425/547
5,423,670 A *  6/1995  Hamel ........................ 425/547
6,143,215 A * 11/2000  McCollum et al. .......... 425/552
6,398,537 B2   6/2002  Matysek ..................... 425/183

FOREIGN PATENT DOCUMENTS

DE   4000766 A1    7/1991
EP   B2-0 283 644  10/1996
FR   2558407       7/1985
JP   2000108170 A  4/2000
WO   WO 02/051614 A1  7/2002
WO   WO 03/076164 A   9/2003

OTHER PUBLICATIONS

Stephanie L., "Optimiser Le Chauffage Des Moules Par Thermofluides", Plastiques Modernes Et Elastomeres, Compagnie Francaise D' Editions; Paris, France, vol. 41, No. 6, Jan. 7, 1989, ISSN:0032-1303, p. 47.

* cited by examiner

Primary Examiner—Tim Heitbrink
(74) Attorney, Agent, or Firm—Michael L. Dunn

(57) ABSTRACT

A cooling system for cooling tool parts. The system includes at least one base system including a fluid guided from a fluid inlet through connector lines to a fluid outlet. The tool parts are connected in the direction of through-flow between at least one connector line connected to the fluid inlet and at least one connected to the fluid outlet, wherein, between the at least one connector line connected to the fluid inlet and the at least one connector line connected to the fluid outlet, at least one additional connector line and tool parts which are in flow communication therewith are placed in between such that, on its flow path, the fluid flows through at least two tool parts one after the other.

11 Claims, 6 Drawing Sheets

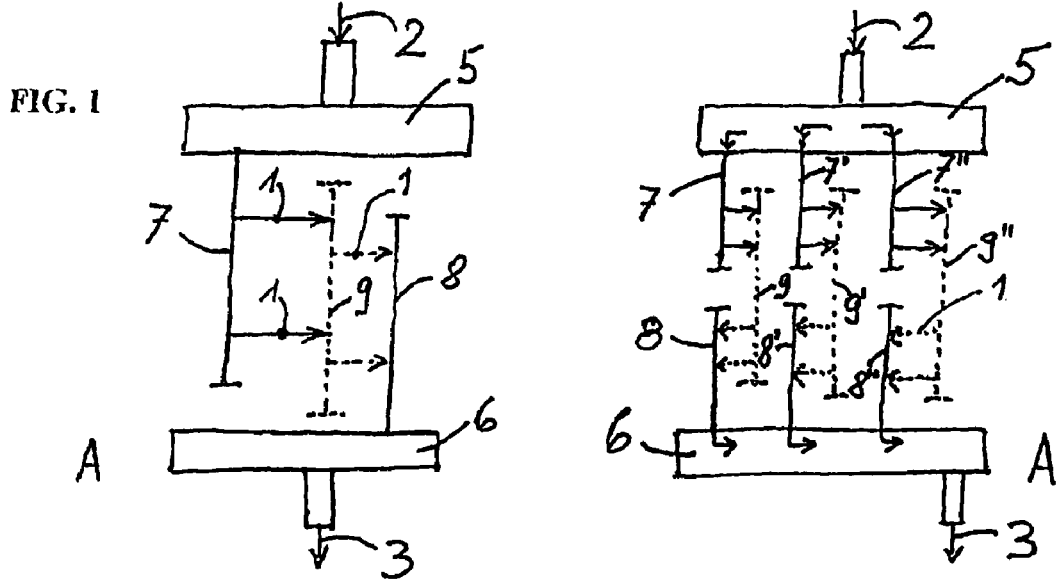
FIG. 1
FIG. 2
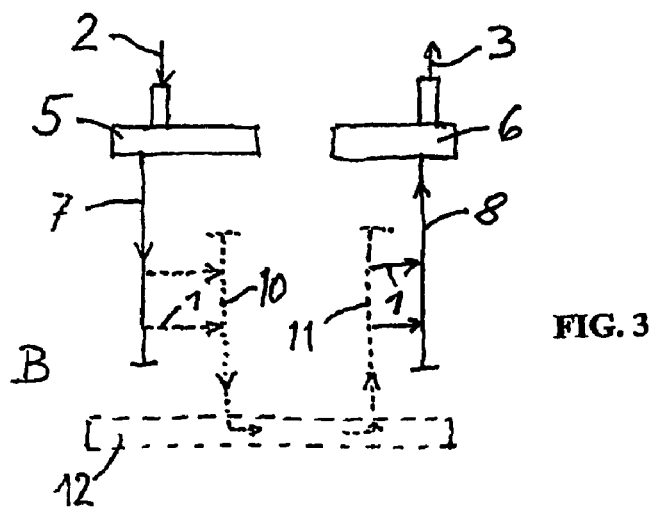
FIG. 3
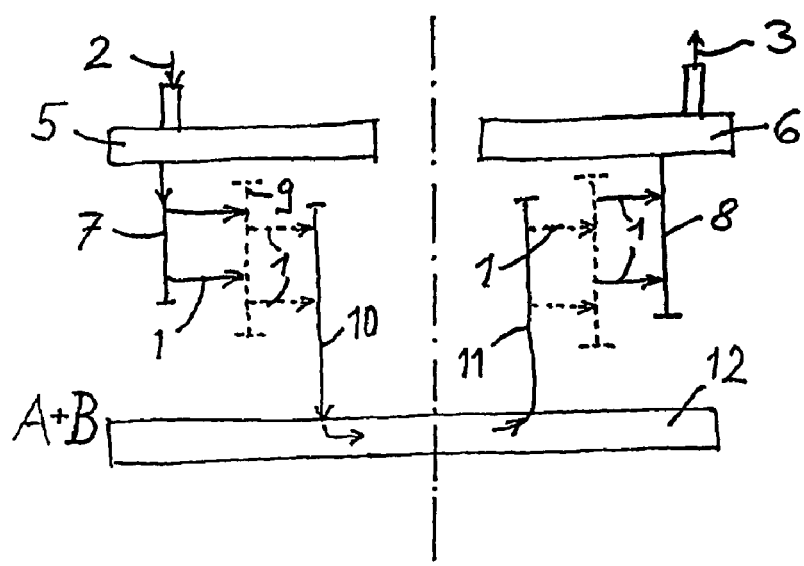
FIG. 4

COOLING SYSTEM FOR THE COOLING OF TOOL PIECES

BACKGROUND OF THE INVENTION

The invention relates to a cooling system for cooling tool parts with the aid of a fluid guided from a fluid inlet through connector lines to a fluid outlet, the tool parts being connected in the direction of through-flow between at least one connector line connected to the fluid inlet and at least one connected to the fluid outlet.

EP-B2-0 283 644 discloses an injection moulding machine which has an injection moulding plate with cavities and a core plate with projecting cores, the number of cores corresponding to the number of cavities. As the moulding plate on the one hand and the core plate on the other move towards one another, the cores engage in the cavities and, in the closed position, form between them the injection mould cavity in which a hollow parison made of synthetic material is shaped by an injection moulding procedure. These parisons, which are in particular made of PET, are later used to make the known PET bottles by blow moulding (PET is polyethylene terephthalate). After the injection moulding, the parisons have to be cooled sufficiently so that they can be processed after the injection moulding procedure without damaging them.

The cooling is carried out in the known injection moulding machines on tubes which are secured to a carrier plate and through which a fluid, in practice cooling water, flows, hence cooling them.

So that it is possible to cool a large number of tool parts, for example tubes or cores, at the same time in as compact a machine as possible, carrier plates with a plurality of tubes secured thereto and with fluid lines running in the carrier plate have been developed. The cooling water is guided for the whole carrier plate, in parallel and more or less simultaneously, from the fluid inlet to the tubes, through which it flows as the relevant tool parts. After that the cooling water, which has been heated up to a certain extent, is guided out through a fluid outlet.

The known cooling system has the features mentioned at the outset, which are also reproduced in the precharacterising clause of the main Claim 1.

The known cooling system suffers from considerable disadvantages, however. Although the cooling lines in the individual tool parts, for example the cores, each have a small cross-section taken by themselves, with a large number of cores through which there is flow simultaneously the individual line cross-sections add up to a considerable size. If we take as an example a known fluid inlet having a diameter of 2.54 cm, then around 2000 mm$^2$ is available as the inlet surface area. The same applies to the fluid outlet. In the case of a 48x core plate, on the other hand, the corresponding cross-sections through which there is flow provide a total surface area of 3770 mm$^2$. This large surface area of consumption is provided with only the small above-mentioned cross-sectional surface area at the fluid inlet. The surface area to be provided to the cores is thus approximately twice the incoming surface area available for the cooling fluid. This means that there is a sharp fall-off in pressure from the fluid inlet to the outlet, and in the region of the cores there is hardly any turbulence because of the consequently lower flow rates of the fluid. In the absence of turbulence, however, the cooling effect drops drastically as well. At the same time, if the core plate contains the connector lines it may disadvantageously clog up, because impurities settle and are not washed away, as a result of the slow flow and the low pressure in the fluid lines.

The heat transfer between the fluid inlet and the fluid outlet is reduced, a further disadvantage.

For a cavity plate, the attempt has already been made to lessen these disadvantages and to increase fluid turbulence, by blocking the possibility of a fluid flowing through to a certain extent as a result of interruptions, in a construction used within the operation. This results in dividing into two a previously single line, and hence making two flow paths out of the originally single flow path. This earlier attempt at a solution relates to a mould plate of a specific shape, however, in which the cooling system is divided into complete sections by providing the interruptions, blocks or barriers in the individual connector lines.

BRIEF DESCRIPTION OF THE INVENTION

The object of the invention is to reconfigure the known cooling system in accordance with the features mentioned at the outset such that, in addition to tubes forming cavities, other tool parts can also be cooled with a relatively high degree of efficiency and with an increase in the fluid turbulence levels.

This object is achieved by the invention in that, between the at least one connector line connected to the fluid inlet, on the one hand, and the at least one connector line connected to the fluid outlet, on the other, at least one additional connector line and tool parts which are in flow communication therewith are placed in between such that, on its flow path, the fluid flows through at least two tool parts one after the other.

BRIEF DESCRIPTION OF THE DRAWINGS

FIG. 1 shows a first embodiment with the basic system (A) of the cooling system according to the invention, FIG. 2 shows a second embodiment of the cooling system, in which the basic system (A) is taken as the basis but in which a plurality of additional connector lines, running in parallel and spaced from one another, are provided, FIG. 3 also shows diagrammatically, like the embodiments of the cooling systems of FIGS. 1 to 2, a second basic system (B) in which the additional connector lines open out into a distributor pipe or are supplied therefrom, respectively, FIG. 4 shows a further diagrammatic embodiment of a cooling system according to the basic system (A), mixed with system (B) (doubled up)

DETAILED DESCRIPTION OF THE INVENTION

Figure 5:
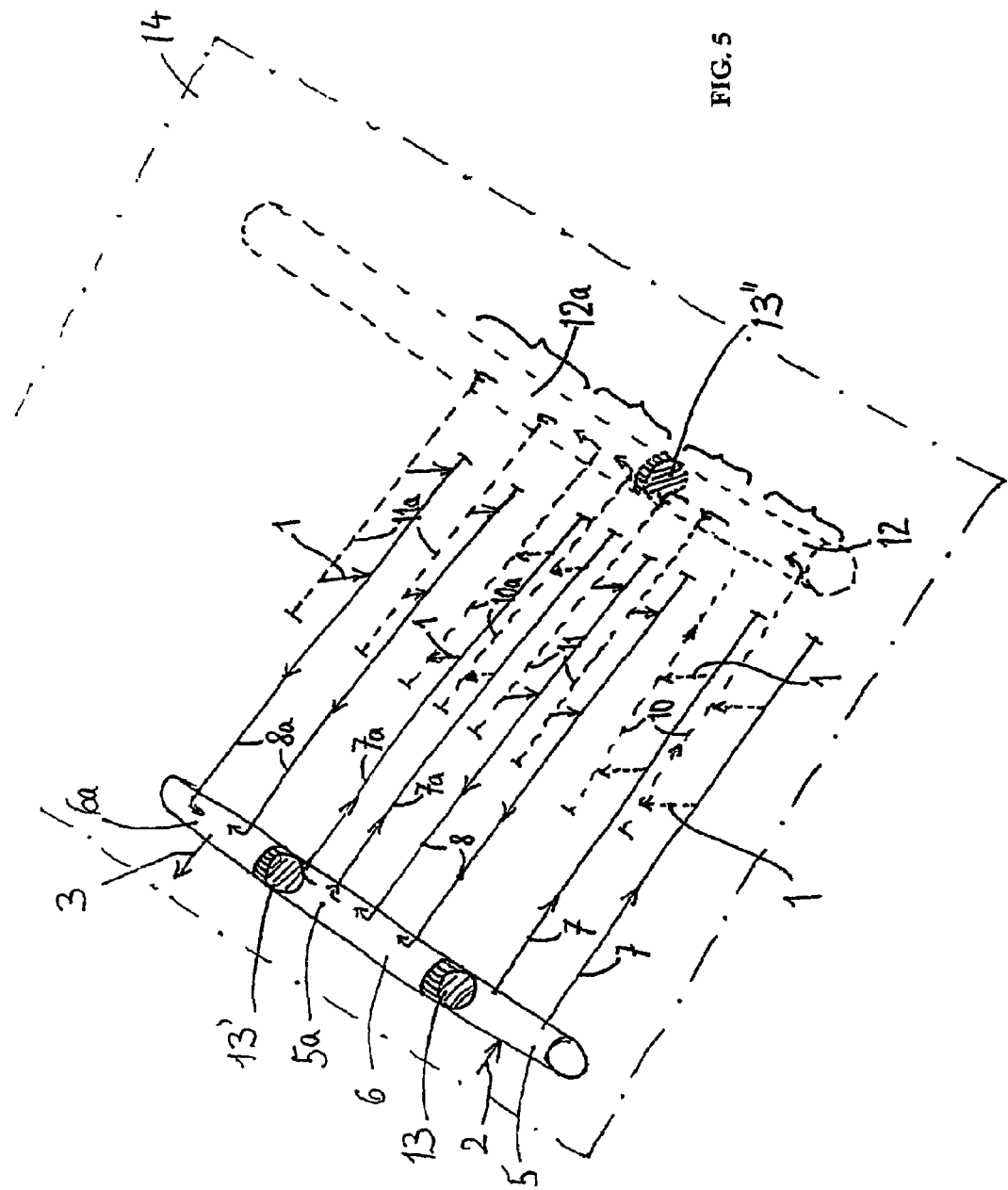
FIG. 5 shows in somewhat concrete terms, but at the same time largely still in abstract form, an illustration of a cooling system in accordance with the second basic system (B), the distributor pipes being divided by plugs.

In accordance with the invention, the term tool parts is used to mean an element through which cooling fluid flows, for example a tube or a core. The invention can also be applied with those tool parts or cores which are secured to a plate, for example the cores on a core plate. Here too, water is presumed to be the cooling fluid and is guided from an inlet through connector lines to an outlet. The connector lines provide the connection to the tool parts. In the case of the known cooling systems, the fluid flows out of the inlet through a connector line and then through the tool part or, in practice, usually through a series of tool parts, to another connector line and from there directly to the outlet. The one connector line is connected to the fluid inlet and the other to the fluid outlet. The tool parts are located between the one and the other connector line.

If, in accordance with the teaching of the invention, a connector line (which could also be designated an intermediate line) is additionally placed between the two connector lines of the known cooling systems, then it is possible to place an additional tool part or, in practice, once again an additional series or group of tool parts in between such that, on its path from the inlet to the outlet, the cooling fluid first of all flows through the one group of tool parts and thereafter (with the aid of the additional connector line) flows through the other group of tool parts. If the intention is to enhance known systems which already have n tool parts, in accordance with the invention, it is possible to create these three groups of connector lines by reconfiguring existing lines such that the water twice flows through n/2 tool parts in cooling manner; or alternatively, on doubling up to 2n tool parts, the cooling water flows first of all through n tool parts and thereafter through another n tool parts. The fluid used for cooling, in particular water, is utilised better as a result; higher levels of turbulence are generated; the heat dissipation is improved; and the risk of soiling is considerably reduced, that is to say any clogging up of the lines is largely avoided.

In the case of the cooling systems known hitherto, there are only the connector lines connected to the fluid inlet—which for the sake of simplicity are called inlet connector lines here, and to simplify matters mention is made of only a single inlet connector line—with the same arrangement on the outlet side, that is to say the one or more connector lines connected to the fluid outlet. Between these, as parts in flow communication, are the tool parts, which may be for example cores, tubes or other elements through which the fluid flows. As far as the flow path of the fluid is concerned, this means that the fluid flows out of the one connector line through the tool part and into the other connector line. In the known case, there is no division of n into twice n/2, or for example of 2n into n+n, if we imagine that there is a group of tool parts having n tool parts. The incoming cooling fluid always seeks out the path of least resistance from the one connector line to the other. Thus, through-flow and cooling occur only in those tool parts in which the flow resistance is sufficiently small. As a result of soil settling in the known cooling systems, for example in the known carrier plate, higher and higher flow resistances gradually build up, so that flow does not continue through all the tool parts in the desired manner to obtain the cooling effect.

If, in accordance with the invention, not all n tool parts are connected in parallel in, for example, only a single section but, as a result of the intermediate line, flow has to take place first of all through n/2 tool parts and thereafter through another n/2 tool parts, the fluid is advantageously forced to flow through twice the number of tool parts, with the further advantage of the higher level of turbulence, better cooling effect and reduced risk of soiling which have been mentioned above.

In a further advantageous embodiment of the invention, the fluid inlet and/or the fluid outlet are each connected to a distributor pipe. The distributor pipe makes it possible to multiply the described conditions, that is to say of multiplying the one connector line, mentioned as a principle above, to give a plurality of connector lines. The respective distributor pipe may have a large diameter and present a small resistance to the flow liquid even if, instead of one connector line, a plurality of connector lines having the correspondingly connected series of tool parts leads from and (in the case of the fluid outlet) to the distributor pipe. The intermediate lines provided in accordance with the invention, that is to say the additional connector lines placed in between, do not thus impede a multiplication of the cooling effect.

It is particularly favourable if, in accordance with the invention, the additional connector line (the intermediate line) furthermore has two closed ends and is connected on both the inflow side and the outflow side to the tool parts. The particular advantage of the cooling system according to the invention is apparent in the case of a carrier plate for the respective tool parts. The individual lines are preferably guided within a carrier plate of this kind, in the manner of bores. It will be appreciated that straight bores may be made in a particularly simple manner, even if they are closed at one or, as in this case, both ends. The position and construction of an additional connector line of this kind are thus easy to achieve, and are also readily possible from the point of view of the volume or space in the carrier plate.

In another embodiment of the invention, it is advantageous if the additional connector line is divided into an inflow line branch and an outflow line branch, these being connected by way of a distributor pipe. It will depend on the size and construction of the carrier plate in the individual cases how many distributor pipes can be arranged in the individual regions of the carrier plate, with the lines of large diameter. For example, it may be advantageous to arrange one distributor pipe at the one end of the plate and the other distributor pipe at the other end of the plate so that correspondingly longer connector lines and additional connector lines can be arranged in between. In this case, those skilled in the art will realise from the teaching just given that a relatively short distributor pipe can be arranged on the one side in the carrier plate at the fluid inlet and, similarly, a relatively short distributor pipe can be arranged at the fluid outlet such that one end of the carrier plate is to a reasonable extent filled or occupied by these two distributor pipes, with the result that space is available for another distributor pipe on the opposite side of the carrier plate. The additional connector lines can now be constructed such that, surprisingly, each line is divided into two branches which are connected by way of the last-mentioned distributor pipe, which can still be accommodated in the carrier plate. The path of the cooling fluid then runs partly in this distributor pipe between the two line branches. This way of guiding the lines has proved favourable for the construction of the carrier plate from a manufacturing point of view since large quantities of fluid can be transported by way of this second distributor pipe, which guides the branches of the additional connector line.

In accordance with the invention, the distributor pipes may furthermore be straight and run parallel and spaced from one another in the carrier plate. The advantage of this from a manufacturing point of view is quite clear. Straight pipes may be in the form of bores, for example deep bores made transversely or longitudinally in a carrier plate. A distributor pipe running in a line may even be divided such that two part-pipes, that is to say two part-bores, are obtained. This division is either carried out geometrically, by making two blind bores, or alternatively a plug may be inserted in a single deep bore.

This construction allows the distributor pipes to be straight, in accordance with the invention, and to run in a line, one behind the other and spaced from one another, in a plate.

Advantageously, the invention is furthermore constructed such that a plurality of additional connector lines running parallel and spaced from one another are placed in between respectively connected tool parts. Whereas the distributor pipes, in each case of relatively large diameter, are generally provided such that they run over the width of a carrier plate, the additional connector lines—called thus in accordance with the invention—or intermediate lines generally extend along a carrier plate of this kind, preferably between the one distributor pipe or group thereof at the one end of the plate and the other distributor pipe or group thereof at the other end of the plate. These additional connector lines generally run approximately perpendicular to the distributor pipes and in practice have a smaller diameter than the distributor pipes. The diameter of the connector lines has to be large enough for sufficient fluid to be able to flow through all the connected tool parts. To ensure a higher cooling capacity or to increase the number of tool parts which are to be cooled by the cooling system according to the invention, advantageously a plurality of connector lines are arranged parallel and spaced from one another. Those skilled in the art will understand that the provision of the additional connector lines means that it is possible for fluid to flow through, and hence cool, a correspondingly large number of additional tool parts. A line construction of this kind is also possible in one of the conventional carrier plates if the recommended arrangements of the lines indicated above are observed.

A distinction can be made between two basic systems. In the one basic system (A), the additional connector line or intermediate line has two closed ends and is connected to the tool parts at both the inflow side and the outflow side.

The other basic system (B) provides for dividing the additional connector line (intermediate line) into the inflow line branch on the one hand and the outflow line branch on the other, with the line branches connected by way of the said distributor pipe.

Both basic systems require the cooling fluid which flows through to flow successively first through the one and thereafter through the other tool part, or to flow first through the one group of tool parts and thereafter through the other group of tool parts. As a result of this, the cooling fluid is better utilized, with the advantages indicated.

The one way of multiplying the cooling effect or multiplying the number of tool parts to be cooled consists, in the manner described above, not in connecting one additional connector line in accordance with the respective basic system but in connecting two or a correspondingly large number of additional connector lines in parallel. The outflow line of the one group is utilised as the inlet line of the next group.

The other improvement and multiplication of the cooling effect provides, in accordance with the invention, for the number of tool parts through which flow successively takes place to be doubled, in a doubling of the basic system (A or B). It will be appreciated that the basic system may also be quadrupled or multiplied appropriately in order accordingly to multiply the number of tool parts to be cooled. In this case, carrier plates which are made appropriately wider may advantageously be employed when straight distributor pipes are used.

Considering the large surface area of a carrier plate, it is in individual cases desirable to make the overall surface area smaller and permitted to enlarge the height of the plate. This gives further and numerous ways of providing longer or more connector lines and distributor pipes in the respective carrier plate. Thus, in accordance with the invention, the additional connector lines (intermediate lines) may advantageously be arranged in the plate at a different level from the connector lines connected to the inlet and/or outlet. The problems of space in a carrier plate are, surprisingly, solved with this advantageous solution. In other words, considerably more connector lines may be accommodated in a plate having a somewhat greater height if these lines are arranged at different levels.

In a favourable embodiment of the invention, the tool part is a tube-shaped mould core of an injection mould for injection moulding parisons made of synthetic material. In a manner known per se, synthetic material is injection moulded onto a mould core of this kind and is driven out through a tube, slipped over appropriately, to form the parison. In order to cool the synthetic material, the mould core must be cooled. For this, cooling water which is pressed through a corresponding cooling system from an inlet, through the casing of the mould core and below the surface thereof, to the outlet. After the injection procedure, the cooling water takes up the thermal energy, and it is desirable to make the best possible utilisation of the cooling capacity of the water. This utilisation is particularly successful if the cooling system according to that aimed at in the invention is used. In this way, effective new injection moulds can be produced, and it is even possible in some cases to reconfigure and improve existing injection moulds.

The invention is further constructed, advantageously, in that the distributor pipe is divided by at least one plug, inserted in flow-tight manner, into at least two separate sections. The fluid communication provided originally in the distributor pipe is interrupted by this plug. It will be clear to those skilled in the art that a connector line can be provided with a plug at almost any desired point, just as a distributor pipe can be provided with one at any desired location. The plug provides what might be called a 100%, or almost 100%, barrier or block. Plugs may be of different constructions, for example made of an elastomer material or only partly made of an elastomer material with, in addition, a hard resistant material such as steel. Although there are also plugs formed entirely of metal which can be used, with the known carrier plates as well, to block an end which is open as a result of its manufacture, in the case of the plug provided in accordance with the invention it is preferable to use steel or rubber or a combination of both. The size of the flow cross-section is not significant. Both connector lines and distributor pipes may be provided with appropriate plugs.

Further advantages, features and possible applications of the present invention will emerge from the description which follows, given in conjunction with the drawings.

FIG. 1 shows in abstract terms the first basic system (A) of the cooling system according to the invention, the arrows that are shown representing tool parts 1 which are for example cores mounted on a carrier plate, namely a core plate 14 (parisons of synthetic material, which are not shown, are injection moulded onto these cores and then have to be cooled). For this reason, cooling water (fluid) has to flow through these tool parts 1. The cooling fluid (water) flows into the tool part (the core) 1 at one point and leaves it, after having been warmed up to a certain extent, at another point, for example at the head of the arrow shown in each case. In the figures, the fluid inlet is designated 2, whereas the fluid outlet is designated 3. The fluid inlet is connected to an inflow distributor pipe 5 and the fluid outlet 3 to an outflow distributor pipe 6. Between the distributor pipes 5 and 6 there are placed connector lines 7, 8 and 9, namely the connector line connected to the fluid inlet 2, which may be designated an inflow line 7. The connector line connected to the fluid outlet 3 may also be designated an outflow line 8. Between these connector lines 7 and 8 there is placed an additional connector line 9 which may also be designated an intermediate line 9. In FIGS. 1 to 5, this intermediate line 9 is shown as a dashed line.

In the embodiment according to FIG. 4 (basic system (A+B)), the intermediate line 9 may be connected by way of an inflow line branch 10 and an outflow line branch 11, which for their part are connected by way of an intermediate distributor pipe 12 and are shown by a solid line. FIG. 4 also has the particular feature that the basic systems (A) and (B) are combined, as will be explained below.

The embodiment of FIG. 2 illustrates the basic system A in FIG. 1 in a multiple form. Here, instead of an inflow line 7 (as in FIG. 1) a plurality of inflow lines (in this case three) 7, 7' and 7" lead out from the inflow distributor pipe 5. Each of these inflow lines 7, 7', 7" supplies a series or group of tool parts 1, of which only two are shown in each case. The outflow end thereof (head of the arrow) opens in each case into the intermediate line 9, that is the additional connector line 9 or 9' or 9" placed in between. In turn, this supplies in each case a further group of tool parts 1, opening into the respective outflow line 8, 8' and 8" (at the arrow head). These outflow lines 8, 8' and 8" are connected to the outflow distributor pipe 6 and the latter is connected to the fluid outlet 3.

In the embodiment of FIG. 3, the inflow distributor pipe 5 is located top left in a straight configuration, in a line with the outflow distributor pipe 6 arranged downstream thereof in the direction of flow and spaced therefrom. Here, both distributor pipes are either geometrically separated from one another, for example being made as blind bores in the solid material of a plate, or the separation is brought about by a plug inside a continuous deep bore which is divided into the two parts, namely the inflow part 5 and the outflow part 6, by the plug. Plugs of this kind are designated 13, 13' and 13" in FIG. 5.

In accordance with FIG. 3, which shows the basic system (B), the inflow line 7 leads from the inflow distributor pipe 5 and is closed off at the downstream end. Leading away from numerous points is a group of tool parts 1 into which the cooling fluid flows and which flows away into the inflow line branch 10 of the additional connector line, designated 9 overall. This inflow line branch 10 is shown in dashed lines because it is part of the additional connector line 9. It is connected to the distributor pipe 12 which is placed in between, and which in this basic system (B) receives the cooling fluid on the left-hand side and discharges it on the right-hand side. This last is shown by the outflow line branch 11, also shown in dashed lines, and also closed off at its outflow end. From this too there leads a whole series of tool parts 1 whereof the downstream ends (arrow heads) open into the outflow line 8. At the upstream end, this outflow line 8 is also closed off and opens at the downstream end into the outflow distributor pipe 6.

In the embodiment of FIG. 4, similarly to the case of the first basic system (A) in accordance with FIG. 1, the cooling fluid flows out of the fluid outlet 2 into the inflow distributor pipe 5 and from there into the inflow line 7, which is in turn closed off at the downstream end. A whole series of tool parts 1 is supplied by this inflow line 7 with cooling fluid which flows out into the intermediate line (the additional connector line) 9, which is shown in dashed lines and is closed off at both ends. This intermediate line 9 too is connected to a series of tool parts through which the cooling fluid flows and which are cooled thereby. The respective arrow head illustrates the downstream end of the tool part 1 out of which the cooling fluid flows into the inflow line branch 10 and from there through the distributor pipe 12 placed in between into the outflow line branch 11, taking into account the conditions of the basic system B in FIG. 3.

However, FIG. 4 can also be considered in relation to the basic system (A) if the inflow line branch 10 to the left of the dot-and-dashed line in FIG. 4 is considered as the outflow line which would lead the cooling fluid into an outflow distributor pipe 6 if the outflow point were there. In fact, however, the cooling fluid continues to flow in this distributor pipe 12 placed in between such that the outflow line branch 11 is supplied from the right-hand half thereof in relation to the dot-and-dashed separating line in FIG. 4, that is to say it is supplied from the distributor pipe 12. This line branch 11 could thus be regarded as the inflow line 7 of the basic system (A). The basic system (A) is arranged on the right-hand side of the dot-and-dashed line in FIG. 4, but simply in mirror image to the left-hand half.

However, it will be appreciated that the doubling up of the basic system (A) or (B) is illustrated in FIG. 4. The number of tool parts 1 through which flow passes successively in the embodiment of FIG. 4 is in fact twice that in FIG. 1.

Regardless of this doubling up, the multiplication in accordance with FIG. 2 still applies, in which instead of one inflow line 7 three inflow lines 7, 7', 7" etc. may be used. The advantageous possibility of multiplying the cooling system in line with these principles will be evident.

FIG. 5 shows another further embodiment of a cooling system in accordance with the invention, made somewhat more concrete than the diagrammatic illustration of FIGS. 1 to 4. For example, the dot-and-dashed outside line indicates a plane which lies obliquely in space. This plane could for example represent a carrier plate 14. It can be envisaged that mould cores projecting vertically upwards and perpendicular to this plane are possible tool parts 1 whereof the inflow of cooling fluid lies for example outside, in an upper plane of the carrier plate 14, and whereof the outflow end lies further inside in the same plane. Similarly, in FIG. 5 the respective tool part 1 (with solid or dashed lines) is illustrated as an arrow which in each case connects two lines to show that the cooling fluid flows from the one line into the other in the direction of the arrow. This makes the principle clearer to the reader, and yet flow through a mould core of an injection mould is the same with the principle of this cooling system. The solid lines show (more on the left-hand side) a line system in the lower level of the carrier plate 14, while the opposing other line system in dashed lines should be visualised as arranged in the upper level. Thus, the inflow distributor pipes 5, 5a and the outflow distributor pipes 6, 6a are in the lower level, while the inflow line branches 10 and 10a are in the upper level, as are the outflow line branches 11 and 11a. Similarly in the upper level are the distributor pipes 12 and 12a placed in between, which run in a line one behind the other and are separated from one another by a plug 13". On the opposite side (top left in FIG. 5), the inflow distributor pipe 5 is separated from the outflow distributor pipe 6 by the plug 13. This outflow distributor pipe 6 merges into the inflow distributor pipe 5a of the next section and is separated from the outflow distributor pipe 6a by the plug 13' in the direction in which this distributor pipe 5a extends, downstream of the latter. Because distributor pipes and lines in the cooling system are made by making deep bores in the carrier plate 14, the distributor pipes 5, 6, 12 are straight and run parallel and spaced from one another in the carrier plate 14. In addition, the distributor pipe shown in solid lines runs in the lower level of the carrier plate 14 with its sections in a line one behind the other, kept spaced from one another either by a plug 13, 13' or by the material of the carrier plate 14 itself, if the respective distributor pipe is constructed simply as a blind bore.

The connector lines, that is the inflow lines 7 and 7*a,* run (in the lower level or on the lower plane) approximately perpendicular to the direction in which the distributor pipes extend. The outflow lines 8 and 8*a* lie parallel to the inflow lines 7 and 7*a,* in the lower level.

In the embodiment of FIG. 5, the so-called additional connector lines or intermediate lines 9 are divided into an inflow line branch 10 and an outflow line branch 11 which are connected by way of the distributor pipe 12. These are the lines and distributor pipes shown in dashed lines, which are on the upper level of the carrier plate 14. This therefore constitutes the basic system B. Moreover, there is a doubling up of the basic system B, with a circuit according to FIG. 3 doubled so that the number of tool parts 1 or mould cores through which there is successive flow is doubled. The two-row cooling becomes four-row cooling.

Tracing the path of flow of the cooling fluid from the fluid inlet 2 (top left in FIG. 5), the fluid flows through the inflow distributor pipe 5 into the inflow line 7, through the first group of tool parts 1 into the inflow line branch 10; and from there (now on the upper level) into the intermediate distributor pipe 12. The fluid leaves this distributor pipe 12 through the outflow line branches 11, from which its flow acts on the second group of tool parts 1, so that the cooling fluid flows through the outflow line 8 into the outflow distributor pipe 6. An extension to the latter develops into the inflow distributor pipe 5*a,* namely upstream of the second plug 13', and leaves this distributor pipe 5*a* by way of the inflow line 7*a,* through the third group of tool parts 1 and into the inflow line branch 10*a.* From here, the intermediate distributor pipe 12*a* receives the fluid and discharges it through the outflow line branches 11*a* into the fourth and last group of tool parts 1. The fluid then flows through the latter into the outflow line 8*a,* the outflow distributor pipe 6*a* and out through the fluid outlet 3.

Figure 6:
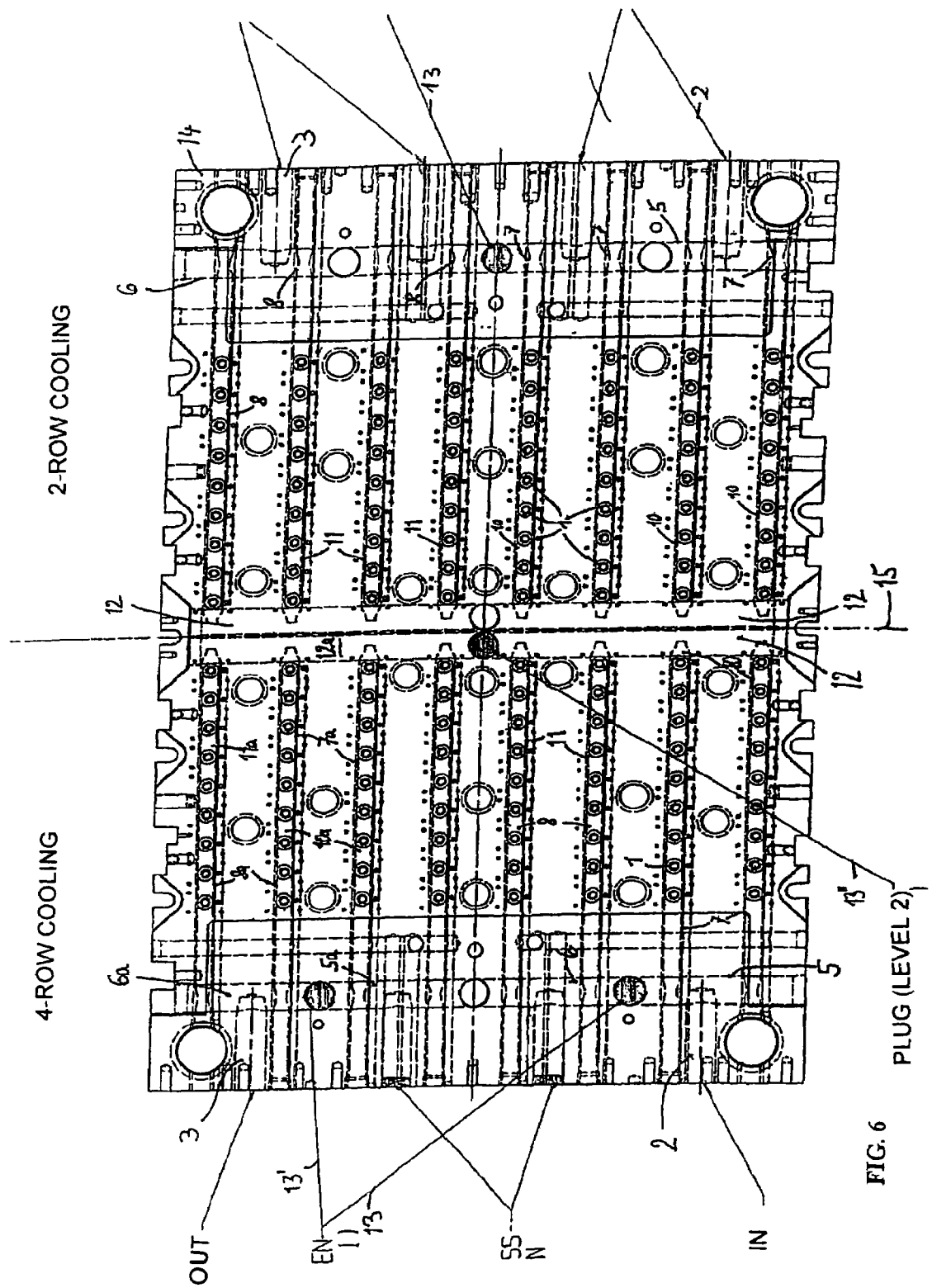
FIG. 6 shows in more concrete terms the structure of a carrier plate having the cooling system which is built up in the form of bores and which uses the second basic system (B); in the left-hand half there is four-row cooling and in the right-hand half there is two-row cooling.
Figure 7:
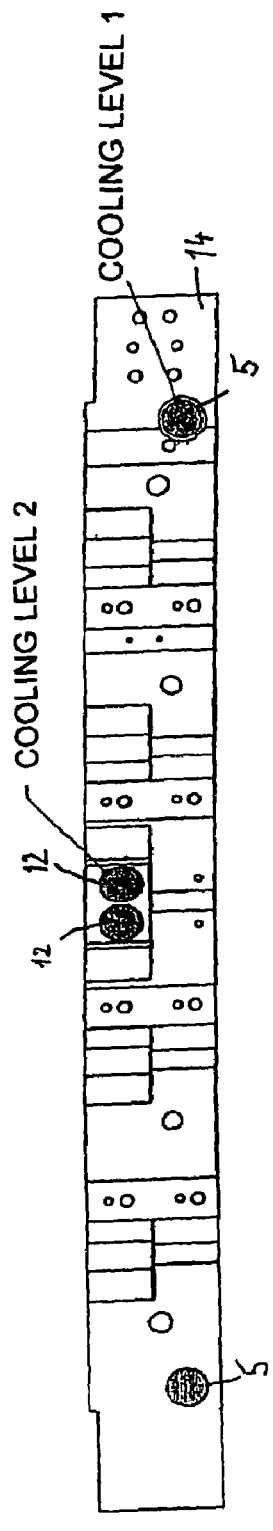
FIG. 7 shows a side view of the carrier plate according to FIG. 6, as seen in the longitudinal direction from one end of the plate to the other.

FIGS. 6 and 7 show a carrier plate in the form of a mould core, in an embodiment taking more concrete form. FIG. 6 shows in plan view four-row cooling in the left-hand half and two-row cooling in the right-hand half, although the number of bores is the same in both halves. The difference is that in the right-hand half of the two-row cooling only a single plug 13 is arranged centrally in the plate 14, in the bottom right distributor pipe 6; two plugs are arranged in the top left (upper level) distributor pipe 5, 6.

With reference to FIG. 6, the embodiment with two-fold cooling will first be explained, to the right of the dot-and-dashed centre line 15. This relates to the second basic system B in accordance with FIG. 3, as though seen in mirror image. Flow is through only two groups of tool parts 1 in the form of mould cores.

The cooling fluid flows from the fluid inlet 2 into the inflow distributor pipe 5 arranged at the bottom, from which the inflow lines 7, also lying at the bottom, are supplied. Between these lines 7 and the inflow line branches 10 arranged above them there is the first group of tool parts 1 in the form of mould cores, which in FIG. 6 project vertically upwards towards the viewer, in opposition to the direction of view. The receivers for these mould cores or tool parts 1 can be seen as circles (in FIG. 3, the viewer would look towards the tool parts 1 by looking onto the arrow heads in the direction of the arrows). The cooling fluid leaves the inflow line branch 10 through the undivided intermediate distributor pipe 12, into which the fluid flows from the lower four line branches 10, through the four outflow line branches 11 shown at the top in FIG. 6 and out again to the right (still on the upper level).

As shown diagrammatically in FIG. 3, the fluid flows out of the upper outflow line branch 11 through the tool parts 1 and into the outflow line 8, arranged parallel and underneath. This outflow line 8 is connected on the right to the upper part of the right-hand lower distributor pipe, that is the outflow distributor pipe 6, from which the cooling fluid leaves the carrier plate 14 by way of the fluid outlet 3.

In the left-hand half of the carrier plate 14 in FIG. 6, which is shown in cross-section in FIG. 7 with the space for the two different levels, more plugs are provided, that is in a manner similar to that in FIG. 5 there is a plug 13" in the upper distributor pipe 12 and, opposite and on the left, almost at the edge of the plate 14 in the lower level, there are two plugs 13 and 13' in the distributor pipe 5, 6. By comparison with the embodiment of the right-hand half the number of rows or groups of tool parts 1 is doubled, from flow through two groups or rows of tool parts 1 on the right-hand side there are now four groups of tool parts 1 on the left-hand side. FIG. 5 can be used here for the purpose of orientation.

The fluid inlet 2 is arranged on the left and opens into the inflow distributor pipe 5, made in the lower level of the carrier plate 14. From there, the fluid flows through the inflow line 7 (the singular is used here although there are two parallel inflow lines), above which the inflow line branch 10 arranged in the upper level is bored. Between these there is again the row or group of tool parts 1 through which the cooling fluid flows on its path from the inflow line 7 to the inflow line branch 10. The fluid flows off into the intermediate distributor pipe 12, which in FIG. 6 extends upwards, similarly to the embodiment in the right-hand half, but with the difference that this intermediate distributor pipe 12 ends in the upward direction at the plug 13". The cooling fluid can once again flow through the outflow line branches 11 located in the upper level and then through the groups of tool parts 1 and the outflow lines 8 located underneath. The lines 8 open at the left-hand end of the carrier plate 14 into the outflow distributor pipe 6. This distributor pipe 6 receives the cooling fluid and merges, in the outflow part (of the half) downstream thereof, into the inflow distributor pipe 5*a.* This last ends at the upper plug 13' and is therefore considered to be an inflow part, because it permits inflow to the right into the inflow lines 7*a.* The cooling fluid then passes through the tool parts 1 into the inflow line branches 10*a* arranged above the inflow lines 7*a* and away to the right, into the intermediate distributor pipe 12*a,* which is separated from the distributor pipe 12 (at the bottom) running in a line therewith by the plug 13". Finally, the fluid flows out of this distributor pipe 12*a* through the outflow line branches 11*a* through the groups of tool parts 1 into the outflow line 8*a,* through the outflow distributor pipe 6*a* and out through the fluid outlet 3. Once again, it is easier to orient oneself from the diagrammatic illustration in FIG. 5.

Figure 8:
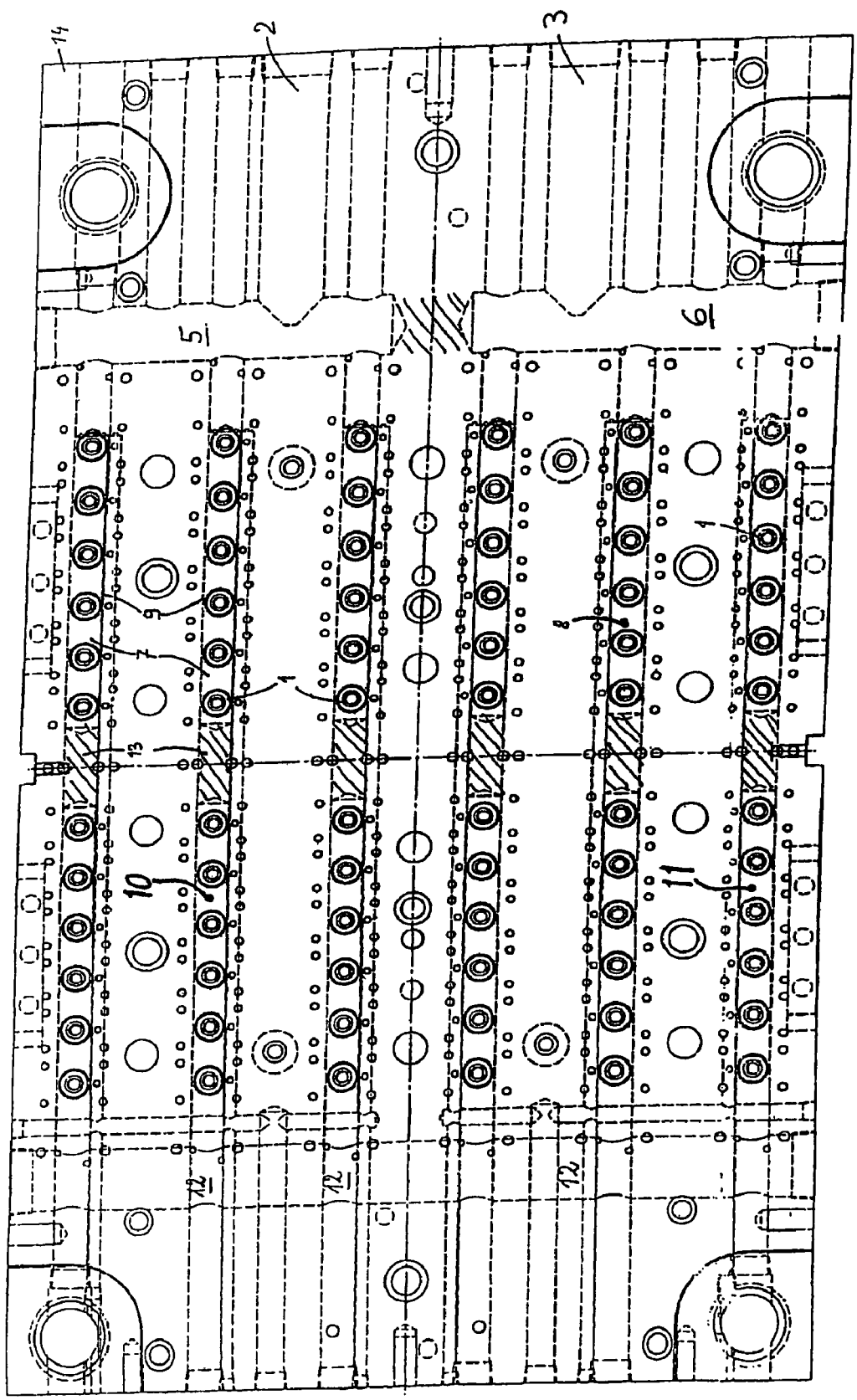
FIG. 8 shows another concrete embodiment, using the first basic system (A), with four-row cooling.

Yet another embodiment is shown in the more concrete form of a carrier plate 14 in FIG. 8. In the case of this embodiment, the illustrations of the first basic system A can be used for orientation, in other words in principle using FIG. 2. Approximately in the centre of the carrier plate illustrated in plan view in FIG. 8 there are hatched areas in the connector lines, which in FIG. 8 run from left to right, and also an intermediate region approximately in the centre, in the distributor pipe on the right. These hatched areas indicate material which has been left in place and which thus forms a block or barrier, like a plug. This embodiment of FIG. 8 relates to four-row cooling, similar to that in FIG. 4, in accordance with the basic system A+B. The fluid flows from the fluid inlet 2 into the inflow distributor pipe 5 at the top and from there downwards and to the left (lower level) into three parallel inflow lines 7. Additional connector lines 9 (intermediate lines) are arranged above these in the upper level. Once again, tool parts 1 are shown between the inflow line 7 and the intermediate line 9, connected to the through-flow and in the form of multiple circuits. A series of these tool parts 1 in the form of mould cores comprises six mould cores, and flows takes place through three rows at the same time. Thus, eighteen mould cores are connected in parallel. The barriers, in FIG. 8 designated 13 like the plugs for the sake of simplicity, are only in the lower level of the inflow line 7, whereas in the upper level of the intermediate line 9 the cooling fluid can flow on to the next group of three times six tool parts 1. Flow then takes place through the latter and is guided away through the branch, first called an inflow line branch 10, and supplied to the intermediate distributor pipe 12. The top three connector lines 9 are fed into the distributor pipe 12 arranged at the top, as is shown diagrammatically in the left-hand half of FIG. 4 alongside the dashed line. If in FIG. 4 the cooling fluid overshoots this line, by flowing on in the intermediate distributor pipe 12, the fluid will enter the other half, in other words first the outflow line branches 11 in the lower level, and flow out of these through the tool parts 1 to the upper level and the additional connector line or intermediate line 9 and, in FIG. 8, into the right-hand half of the plate 14. In that case, the fluid already flows through the third group of tool parts in cooling manner at this stage. In accordance with FIG. 8, the fluid now flows in the bottom right quadrant of the plate 14 through the fourth and last group of tool parts 1 and into the outflow line 8 in the lower level in order, from there, to flow to the right into the outflow distributor pipe 6 and from there out through the fluid outlet 3. Where necessary, FIG. 4 can be used for orientation for completion of the flow path of the cooling fluid.

Figure 9:
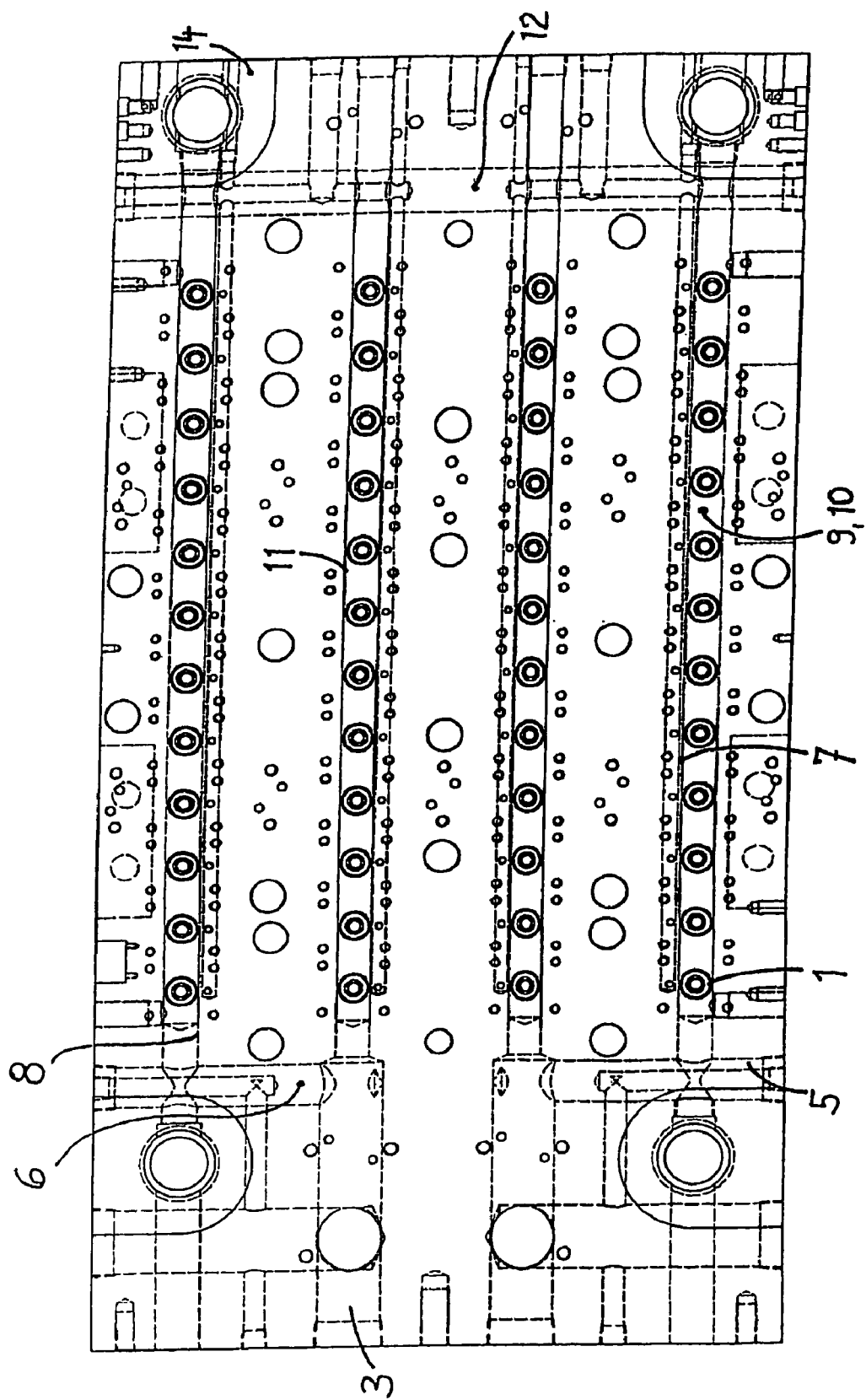
FIG. 9 shows a further, different embodiment of the cooling system with two-fold cooling, using the second basic system (B).

FIG. 9 shows a carrier plate 14 of similar construction to that in FIG. 8, but in which the barriers or plugs 13 arranged in the centre of FIG. 8 can be imagined as missing, such that the cooling fluid flowing off to the right from the inflow distributor pipe 5 in the lower level flows into a respective inflow line 7, which extends from left to right over most of the length of the carrier plate 14 and connects to twelve tool parts 1. Flow through this first group of tool parts 1 is parallel in the embodiment of FIG. 9. The cooling fluid leaves these tool parts 1 (which are in the form of mould cores) on the upper level through the additional connector line (intermediate line) 9, which opens on the right into the intermediate distributor pipe 12. The latter receives the fluid from the bottom two rows of in each case twelve tool parts 1 in FIG. 9 and guides it upwards and, in a manner similar to that shown diagrammatically in FIG. 3, discharges it into the outflow line branch 11 again. The latter is part of the additional connector line (intermediate line) 9 and, like the intermediate line 9 described above, which feeds the distributor pipe 12, is also an inflow line branch 10. Once it has left the outflow line branch 11, the cooling fluid then flows into the second and last group of tool parts 1 and leaves the plate 14 by way of the outflow line 8 and the outflow distributor pipe 6 through the fluid outlet 3. The diagrammatic FIG. 3 can be used as orientation for illustration of this second basic system B.

LIST OF REFERENCE NUMERALS

1 Tool part
2 Fluid inlet
3 Fluid oudtlet
4 Core plate (=carrier plate)
5, 5*a* Inflow distributor pipe
6, 6*a* Outflow distributor pipe
7, 7*a* Connector line—inflow line
8, 8*a* Connector line—outflow line
9, 9*a* Intermediate line (additional connector line)
10, 10*a* Inflow line branch of the intermediate line 9
11, 11*a* Outflow line bratch of the intermediate line 9
12, 12*a* Intermediate distributor pipe
Plug
13'Plug
13"Plug
14 Carrier plate
15 Centre line

The invention claimed is:

1. A cooling system for cooling tool parts (1) with the aid of fluid guided from a fluid inlet (2) through connector lines (7, 8, 9) to a fluid outlet (3), the tool parts (1) being connected in the direction of through-flow between at least one connector line (7, 8, 9) connected to the fluid inlet (2) and at least one connector line connected to the fluid outlet (3), wherein, between the at least one connector line (7) connected to the fluid inlet (2) and the at least one connector line (8) connected to the fluid outlet (3), at least one additional connector line (9; 10-12) and tool parts (1) which are in flow communication therewith are placed in between such that, on a flow path, the fluid flows through at least two tool parts (1) one after the other and at least one of the fluid inlet (2)and the fluid outlet (3) are each connected to a distributor pipe divided into at least two separate sections by arrangement of at least two blind bores or at least one plug.

2. A cooling system according to claim 1 wherein the additional connector line (9) has two closed ends and is connected on both the inflow side and the outflow side to the tool parts (1).

3. A cooling system according to claim 1 wherein the additional connector line (9) has two closed ends and is connected on both the inflow side and the outflow side to the tool parts (1).

4. A cooling system according to claim 2 wherein the additional connector line (9) is divided into an inflow line branch (10) and an outflow line branch (11), these being connected by way of a distributor pipe.

5. A cooling system according to claim 4 wherein the distributor pipes (5, 6, 12) are straight and run parallel and spaced from one another in a plate (14).

6. A cooling system according to claim 4 wherein the distributor pipes (5, 6, 12) are straight and run in a line, one behind the other and spaced from one another, in a plate (14).

7. A cooling system according to claim 1 wherein a plurality of additional connector lines (7', 7", 8', 8", 9', 9") running parallel and spaced from one another are placed in between connected tool parts (1).

8. A cooling system according to claim 1 wherein the number of tool parts (1) through which flow successively takes place is doubled, in a doubling of the base system.

9. A cooling system according to claim 1 wherein the additional connector lines (9) are arranged in the plate (14) at a different level from the connector lines (7, 8) connected to at least one of the inlet (2) and (3).

10. A cooling system according to claim 1 where the tool part (1) is a tube-shaped mould core of an injection mould for injection moulding parisons made of synthetic material.

11. A cooling system according claim 4 wherein the distributor pipe (5, 6, 12) is divided by at least one plug (13, 13', 13"), inserted in flow-tight manner, into at least two separate sections (5, 6).

* * * * *